US004001581B2

United States Statutory Invention Registration [19]

[11] Reg. Number: H1581

Southwick

[45] Published: Aug. 6, 1996

[54] PROCESS FOR THE REDUCTION OF DIENE POLYMER HOT MELT ADHESIVE COLOR (II)

[75] Inventor: Jeffrey G. Southwick, Houston, Tex.

[73] Assignee: Shell Oil Company, Houston, Tex.

[21] Appl. No.: 148,742

[22] Filed: Nov. 5, 1993

[51] Int. Cl.[6] ..... C08J 3/20; C08K 5/18

[52] U.S. Cl. ..... 524/258

[58] Field of Search ..... 528/492; 525/332.9; 524/242, 255, 251, 258

[56] References Cited

U.S. PATENT DOCUMENTS

| | | | |
|---|---|---|---|
| H1251 | 11/1993 | Southwick | 524/272 |
| 3,452,056 | 6/1969 | Sundholm | 524/258 |
| 4,007,230 | 1/1977 | Hinze | 524/258 |
| 4,117,033 | 9/1978 | Gale | 524/258 |
| 4,125,515 | 11/1978 | Kuczkowski | 524/258 |
| 4,277,391 | 7/1981 | Charles | 524/258 |
| 4,837,259 | 6/1989 | Chucta | 524/258 |
| 4,925,889 | 5/1990 | Capolupo et al. | 524/258 |
| 4,954,548 | 9/1990 | Klingensmith | 524/258 |
| 5,114,998 | 5/1992 | Golder et al. | 524/258 |
| 5,145,896 | 9/1992 | Southwick | 524/180 |

*Primary Examiner*—Charles T. Jordan
*Assistant Examiner*—John R. Hardee

[57] ABSTRACT

A method of reducing the color of a hot melt adhesive formulation comprising a coupled polymer of a conjugated diene which comprises adding to the formulation an amount of 4,4'-bis(alpha,alpha-dimethylbenzyl)diphenylamine sufficient to reduce color formation. This method is especially effective for epoxy resin coupled polymers and sequentially polymerized polymers.

8 Claims, No Drawings

PROCESS FOR THE REDUCTION OF DIENE POLYMER HOT MELT ADHESIVE COLOR (II)

BACKGROUND OF THE INVENTION

This invention relates to the reduction of color formation in hot melt adhesive formulations which contain diene polymers, especially block copolymers of conjugated dienes and vinyl aromatic hydrocarbons. More particularly, it relates to the reduction of such color formation by the addition of a specific aromatic amine compound to such formulations.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as butadiene or isoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A-B-A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A-B-A rubber to behave like a conventionally vulcanized rubber in the unvulcanized state and is applicable for various uses. For example, these network forming polymers are applicable for uses such as in adhesive formulations; as moldings of shoe soles, etc.; impact modifier for polystyrene resins and engineering thermoplastics; modification of asphalt; etc.

Many such polymers are made by coupling with coupling agents as described in U.S. Pat. No. 4,096,203. Such coupling agents may contain halogens and often there is some residual halogen which reacts with residual lithium to form LiX. Other coupling agents, such as epoxy resins, are also used.

Adhesive formulations containing coupled polymers, especially those containing LiI, LiCl or LiBr salts, are known to develop a brown color when aged at high temperatures such as 177° C. Polymers coupled with epoxy resins and sequentially polymerized polymers exhibit this behavior to a lesser degree because the process for making these polymers does not produce a lithium halide salt as a by-product. This is considered a problem for hot melt adhesive manufacturers who sometimes hold adhesives at high temperatures for extended times during hot melt application. The brown color is undesirable for many end uses for such adhesive products such as diaper assembly, clear labels, clear tapes, clear decals, etc. I have found that the use of a specific aromatic amine compound will greatly reduce the color formation in hot melt adhesive formulations which include epoxy resin-coupled polymers.

SUMMARY OF THE INVENTION

The present invention provides a method of reducing the color of a hot melt adhesive formulation comprising coupled polymers including block copolymers of a conjugated diene and a vinyl aromatic hydrocarbon. The process comprises adding to the formulation an amount of 4,4'-bis(alpha,alpha-dimethylbenzyl)diphenylamine sufficient to reduce color formation. In a preferred embodiment, at least about 0.2 parts per hundred of rubber (phr) of the compound should be used (the "rubber" in phr refers to the polymer). The present invention also encompasses a color stabilized product made by the above process.

DETAILED DESCRIPTION OF THE INVENTION

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,3-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethylstyrene, vinylnapthalene, vinylanthracene and the like may be used. The copolymers may, of course, be random, tapered, block or a combination of these, in this case block.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetratin, decalin and the like.

The process by which the block copolymers are prepared is critical to this invention only in that an unexpectedly large improvement in color stability is seen with polymers produced so that lithium bromide salt is not produced as a by-product. Polymers not containing LiBr as a by-product include epoxy resin coupled polymers and sequentially polymerized polymers. In the case of a coupled A-B-A triblock copolymer, a polystyrene block (A) is anionically polymerized and then a short polydiene block (B) is added thereto. A coupling agent is then added to the mixture and, depending upon the functionality available on the coupling agent, two or more of the anionically polymerized A-B "arms" are coupled together through the coupling agent to form the polymer. This process is described in detail in U.S. Pat. No. 4,096,203 which is herein incorporated by reference. Coupling agents that are particularly useful in this invention include EPON® 825 resin and methyldimethoxysilane since they do not produce LiBr as a by-product. However, polymers made with coupling agents that do produce LiBr, such as dibromoethane, can also be improved in color using the aromatic amine compound of the present invention.

The invention is also especially useful with sequentially polymerized copolymers. In the case of a sequential polymerization of A-B-A triblock copolymer, a polystyrene block is anionically polymerized, followed by polymerization of a conjugated diene block, and followed once again by a block of polystyrene. No coupling agent is required and there is no LiBr in the polymer produced.

The aromatic amine compound of the present invention has special utility when used in a polymer of the type described herein which has been coupled with an epoxy resin. The epoxy resin component of the composition can be any curable resin having, on the average, more than one vicinal epoxide group per molecule and which has at least one aromatic group, and may bear substituents which do not materially interfere with the curing reaction.

Suitable epoxy resins include glycidyl ethers prepared by the reaction of epichlorohydrin with an aromatic compound containing at least one hydroxyl group carried out under alkaline reaction conditions. The epoxy resin products obtained when the hydroxyl group-containing compound is bisphenol-A are represented below by the structure below wherein n is zero or a number greater than 0, commonly in the range of 0 to 10, preferably in the range of 0 to 2, and R is H or an alkyl group, preferably methyl or ethyl.

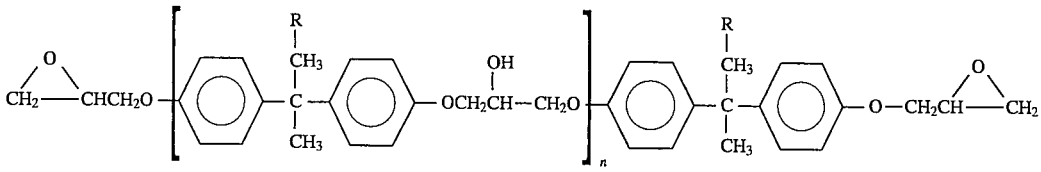

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epichlorohydrin and 2,2-bis(4-hydroxyphenylpropane) (bisphenol-A) having a molecular weight of about 400, an epoxide equivalent (ASTM D-1652) of about 185–192, and an n value (from the formula above) of about 0.2, is presently the preferred epoxy resin because of its low viscosity and commercial availability.

As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymer containing tapered copolymer blocks including U.S. Pat. Nos. 3,251,905; 3,265,765; 3,639,521 and 4,208,356. The disclosures of all of the patents mentioned in this paragraph are herein incorporated by reference. If desired, these block copolymers can be hydrogenated. Hydrogenation may be effected selectively as disclosed in U.S. Pat. No. Re. 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts.

As discussed above, such adhesive formulations, when used as hot melt adhesives, have a tendency to turn brown when aged at high temperature. I have found that a reduction in the color formation of hot melt adhesive formulations utilizing such block copolymers can be achieved by adding to the formulation an amount of 4,4 '-bis(alpha,alpha-dimethylbenzyl)diphenylamine sufficient to reduce color formation. This particular aromatic amine is especially effective for use in polymers which have been coupled with an epoxy resin. Preferably, 4,4'-bis(alpha,alpha-dimethylbenzyl)-diphenylamine is present in the amount of at least 0.2 parts per hundred rubber. Surprisingly, 4,4'-bis(alpha,alpha-dimethylbenzyl)diphenylamine is effective when other aromatic amines are not.

It may be necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60 percent piperylene, 10 percent isoprene, 5 percent cyclopentadiene, 15 percent 2-methyl-2-butene and about 10 percent dimer, as taught in U.S. Pat. No. 3,577,398 which is incorporated by reference. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpenephenol resins and polymerized mixed olefins. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules.

The amount of adhesion promoting resin employed varies from about 20 to about 400 parts by weight per hundred parts rubber (phr), preferably between about 100 to about 350 phr. The selection of the particular tackifying agent is, in large part, dependent upon the specific block copolymer employed in the respective adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tuffio® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, and skin formation. Stabilizers are typically added to the commercially available compounds in order to protect the polymers against heat degradation and oxidation during the preparation, use and high temperature storage of the adhesive composition. Additional stabilizers known in the art may also be incorporated into the adhesive composition.

This aromatic amine compound also has utility in blends of thermoplastic elastomers and other polymers, especially thermoplastic polymers such as polypropylene, polyethylene, nylon, polycarbonate, polyphenylene ether, etc. This aromatic amine is also advantageous used in blends of thermoplastic elastomers with asphalt.

EXAMPLE 1

In this example, hot melt adhesives were compounded in a Sigma blade mixer. Several formulations utilizing two different polymers and two different antioxidants were utilized as described in Table 1 below. Polymer A was a linear styrene-isoprene-styrene block copolymer coupled with lithium bromide. Polymer B was a similar polymer coupled with an epoxy resin, EPON® 825, a high purity version of EPON® 828 resin, from Shell Oil Company described above. Irganox 565 is a commercial stabilizer from Ciba Geigy with the chemical name 2,4 bis(n-octylthio)-6-(4-hydroxy-3,5-ditertbutylaniline)-2,3,5-triazine. Naugard 445 is an aromatic amine compound available from Uniroyal. This is the compound of the present invention and it is 4,4'-bis(alpha,alpha-dimethylbenzyl)diphenylamine. The formulations utilized are set out below:

TABLE 1

Hot Melt Adhesive Formulations

| | Formulation Number Component Concentration (Parts per Hundred Rubber) | | | | | |
|---|---|---|---|---|---|---|
| Polymer A | 100 | 100 | 100 | — | — | — |
| Polymer B | — | — | — | 100 | 100 | 100 |
| Irganox 565 | — | 0.1 | 0.1 | — | 0.1 | 0.1 |
| Naugard 445 | — | — | 0.3 | — | — | 0.3 |
| Tackifying Resin[1] | 240 | 240 | 240 | 240 | 240 | 240 |
| Oil[2] | 60 | 60 | 60 | 60 | 60 | 60 |
| BHT | .25 | .25 | .25 | .25 | .25 | .25 |

[1]Escorez ® 5300 from Exxon.
[2]Tufflo ® Oil 6056 from Arco.

Aging of the formulations were performed at 177° C. with 100 grams of adhesive formulation in a 200 ml Griffin tallform beaker covered with aluminum foil. Aliquots of the aged adhesive were poured off into 10 ml beakers and these samples were color rated with a Gardner color comparator. Adhesive color was determined initially and after aging for 24, 48 and 96 hours.

TABLE 2

Effect of 4,4'-bis(alpha,alpha-dimethylbenzyl)diphenylamine on the Color Stability of Various SIS Block Copolymers

| | GARDNER COLOR NUMBERS | | | |
|---|---|---|---|---|
| Formulation Polymer | Initial | 24 h | 48 h | 96 h |
| A | 3 | 10 | 13 | 15 |
| A Irganox 565 | 3 | 9 | 13 | 14 |
| A Irganox 565 + Naugard 445 | 3 | 9 | 11 | 12 |
| B | 1 | 6 | 7 | 8 |
| B Irganox 565 | 2 | 7 | 9 | 11 |
| B Irganox 565 + Naugard 445 | 2 | 3 | 3 | 4 |

It can be seen that the use of the Naugard 445 does decrease the color of Polymer A, the dibromoethane coupled polymer, and that the color is better even than the formulation which utilized Irganox 565 alone. However, it can be seen that the positive effect of Naugard 445 is much more dramatic for Polymer B, the epoxy resin coupled polymer. The color is approximately 50 percent better whereas the color of the dibromoethane coupled polymer was only approximately 15 percent better. The exact percentage improvements are shown in Table 3 below:

TABLE 3

Effect of 4,4'-bis(alpha,alpha-dimethylbenzyl)diphenylamine on the Color Stability of Various SIS Block Copolymers (Percentage Improvements)

| | PERCENT COLOR IMPROVEMENT vs NO NAUGARD CASE | | | |
|---|---|---|---|---|
| | Initial | 24 h | 48 h | 96 h |
| Polymer A + Irganox 565 + Naugard 445 | 0 | 10 | 15 | 20 |
| Polymer B + Irganox 565 + Naugard 445 | 0 | 50 | 57 | 50 |

EXAMPLE 2

This is a comparative example which contrasts the results shown above for the compound of the present invention with the results which are achieved with another aromatic amine compound and other well known stabilizers. Phenylene diamine antioxidant (Flexzone 6H) was mixed into the adhesive formulation described in Table 1. The color produced upon mixing was very dark (Gardner Color Number>15) even before any aging at 177° C. This behavior is characteristic of aromatic amine antioxidants. They are well known in the industry to be "staining." The aromatic amine of the present invention is uniquely nonstaining and therefore useful in color sensitive adhesive formulations.

Phosphite antioxidants are well known as being useful in retarding the formation of color as materials are aged. A well known and widely used phosphite is trisnonylphenylphosphite (TNPP). Also, a commercially available product that is a mixture of TNPP with trisdinonylphenylphosphite (Polygard HR) is commonly used. Table 4 compares the utility of Polygard HR against Naugard 445 in combination with the phenolic antioxidant Irganox 565 in the standard adhesive formulation (Table 1). It is obvious that only Naugard 445 provides significantly improved color stability in these systems.

TABLE 4

Comparison of Naugard 445 with Polygard HR - Adhesive Color

| | GARDNER COLOR NUMBERS | | | |
|---|---|---|---|---|
| | Initial | 24 Hour | 48 Hour | 96 Hour |
| Polymer B<br>0.1 phr Irg. 565 + | 2 | 3 | 3 | 4 |

TABLE 4-continued

Comparison of Naugard 445 with Polygard HR - Adhesive Color

| | GARDNER COLOR NUMBERS | | | |
|---|---|---|---|---|
| | Initial | 24 Hour | 48 Hour | 96 Hour |
| 0.3 phr Naugard 445<br>Polymer B<br>0.1 phr Irg. 565 +<br>0.3 phr Polygard HR | 2 | 6 | 11 | 12 |

I claim:

1. A method of reducing the color of a hot melt adhesive formulation comprising a coupled polymer of a conjugated diene which comprises adding to the formulation an amount of 4,4'-bis(alpha,alpha-dimethylbenzyl)diphenylamine sufficient to reduce color formation.

2. The method of claim 1 wherein the concentration of 4,4'-bis(alpha,alpha-dimethylbenzyl)diphenylamine is at least 0.2 parts per hundred rubber.

3. The method of claim 1 wherein the polymer is a block copolymer of a conjugated diene and a vinyl aromatic hydrocarbon.

4. The method of claim 1 wherein the polymer is coupled with an epoxy resin.

5. The product of the method of claim 1.

6. The product of the method of claim 2.

7. The product of the method of claim 3.

8. The product of the method of claim 4.

* * * * *